(12) United States Patent
Timiri et al.

(10) Patent No.: US 7,660,590 B2
(45) Date of Patent: Feb. 9, 2010

(54) TERMINAL-BASED SERVER FOR LOCATION TRACKING

(75) Inventors: Shailender Timiri, Bellevue, WA (US); Marc Sather, Kingston, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 146 days.

(21) Appl. No.: 10/950,034

(22) Filed: Sep. 24, 2004

(65) Prior Publication Data

US 2005/0136942 A1 Jun. 23, 2005

Related U.S. Application Data

(60) Provisional application No. 60/532,100, filed on Dec. 23, 2003.

(51) Int. Cl.
*H04W 24/00* (2009.01)

(52) U.S. Cl. .............. 455/456.3; 455/456.1; 455/404.2; 455/41.2; 455/561; 455/426.2; 370/352; 370/328; 370/338

(58) Field of Classification Search ... 455/456.1–456.6, 455/3, 5, 414.1–414.3, 517–519, 466, 41.2, 455/404.1–404.2, 561; 342/457; 340/988; 701/207; 370/351–356; 709/203–206
See application file for complete search history.

(56) References Cited

U.S. PATENT DOCUMENTS

| | | | |
|---|---|---|---|
| 5,295,179 A * | 3/1994 | Asahara et al. | 455/459 |
| 5,666,661 A * | 9/1997 | Grube et al. | 455/509 |
| 6,195,557 B1 * | 2/2001 | Havinis et al. | 455/456.2 |
| 6,202,023 B1 * | 3/2001 | Hancock et al. | 701/201 |
| 6,295,454 B1 * | 9/2001 | Havinis et al. | 455/456.3 |
| 6,334,059 B1 * | 12/2001 | Stilp et al. | 455/456.3 |
| 6,493,558 B1 * | 12/2002 | Bernhart et al. | 455/466 |
| 6,757,545 B2 * | 6/2004 | Nowak et al. | 455/456.2 |
| 7,020,480 B2 * | 3/2006 | Coskun et al. | 455/466 |
| 7,117,015 B2 * | 10/2006 | Scheinert et al. | 455/561 |
| 7,177,623 B2 * | 2/2007 | Baldwin | 455/404.2 |
| 7,421,277 B2 * | 9/2008 | Burroughs | 455/456.2 |
| 7,587,712 B2 * | 9/2009 | Mountain et al. | 717/148 |
| 2002/0196770 A1 * | 12/2002 | Lin | 370/349 |
| 2003/0174648 A1 * | 9/2003 | Wang et al. | 370/235 |
| 2004/0106414 A1 * | 6/2004 | Ewert et al. | 455/456.1 |
| 2004/0116073 A1 * | 6/2004 | Mauney et al. | 455/41.2 |
| 2004/0121766 A1 * | 6/2004 | Benson et al. | 455/425 |
| 2004/0122976 A1 * | 6/2004 | Dutta et al. | 709/245 |

(Continued)

FOREIGN PATENT DOCUMENTS

WO  WO 03/105501 A  12/2003

OTHER PUBLICATIONS

S. Matt. International Search Report. Mar. 7, 2005. Rijswijk, The Netherlands. 4 pages.

*Primary Examiner*—Sharad Rampuria (57) ABSTRACT

A mobile terminal device that facilitates location services (LCS) in a cellular network. The system, as embodied in a mobile terminal device, comprises a mobile communications component that communicates wireless signals, and a location services component embodied in the mobile communication component to provide positioning information. A location request is received by the mobile terminal device and processed using the LCS server to activate trigger events. A location-tracking report is autonomously generated for each event and transmitted to the requesting client via MLP or the wireless network signaling protocol.

41 Claims, 7 Drawing Sheets

U.S. PATENT DOCUMENTS

2004/0198397 A1* 10/2004 Weiss ..................... 455/456.5
2004/0229632 A1* 11/2004 Flynn et al. ............. 455/456.3
2006/0133329 A1*  6/2006 Lewis et al. ................ 370/338
2006/0135159 A1*  6/2006 Andersen et al. ......... 455/435.1
2006/0293066 A1* 12/2006 Edge et al. ............... 455/456.3
2008/0160952 A1*  7/2008 Bull et al. ................ 455/404.2

* cited by examiner

TERMINAL-BASED SERVER FOR LOCATION TRACKING

CROSS-REFERENCE TO RELATED APPLICATIONS

This application claims the benefit of U.S. Provisional Patent Application Ser. No. 60/532,100 entitled "TERMINAL-BASED SERVER FOR LOCATION TRACKING" and filed Dec. 23, 2003, the entirety of which is incorporated by reference herein.

TECHNICAL FIELD

This invention is related to location tracking of mobile devices, and more specifically, a server-based solution for location tracking applications.

BACKGROUND OF THE INVENTION

Cellular telephone manufactures strive to continually provide new and innovative services in an attempt to keep existing customers and draw in new customers in an industry that is already very competitive. Location based services enable personalized services to be offered based on a person's (or item of the person) location. Services include, for example, security reporting, fleet and resource management, location based information, vehicle tracking, person-to-person location, and messaging applications.

Location-based information services allow subscribers to access information for which the information is filtered and tailored based on the location of the requesting user. Service requests may be initiated on demand by subscribers, or automatically, when triggering conditions are met, and may be a singular request or result in multiple deferred responses. Examples of location based information services include the following: navigation to guide the user to his or her destination; city sightseeing to describe historical sights, find restaurants, the airport, bus terminal, etc.; location dependent content broadcast, that support broadcasting content to a user in a certain geographical area; and mobile yellow pages for finding telephone numbers and addresses.

Public communication systems are highly standardized so that device manufacturers, such as cell phone manufacturers, can take advantage of economies of scale by manufacturing different devices using the same communication interfaces for all their customers. Thus, mobile communication devices that work with a first network can also be used with a second network that adheres to the same standardized architecture and signaling protocols as the first network. Standardization has the further advantage that communication networks can easily pass information, such as cellular phone calls or data messages, between themselves if the interface between the networks is standardized.

The basic components of a standards-based location services (denoted LCS—LoCation Services) architecture include an LCS client and an LCS server. The LCS server is a software and/or hardware component that consists of a number of location service components and bearers needed to service the LCS clients. An example of a location service bearer might be a software application for fleet resource management. The LCS server may receive location information requests, process the requests, and send back responses to the received requests. The LCS server supports location based services in parallel with other telecommunication services such as speech, data, messaging, other teleservices, user applications and supplementary services and therefore enable the market for services to be determined by users and service providers.

An LCS client is a software and/or hardware component that interacts with the LCS server for obtaining location information for one or more Mobile Stations within a specified set of parameters. LCS clients subscribe to LCS in order to obtain location information. LCS clients may or may not interact with human users, and may be responsible for formatting and presenting data and managing the user interface (dialogue).

The LCS client and server use LCS messages to exchange information, and each LCS message contains a set of parameters. The LCS messages may comprise a location service request and/or a location service response. The location service request can be of two types: an immediate request that receives an immediate response; and a deferred type, whose response time is delayed (or event-driven) and a response to which can include one or more service responses. A location service request report provides the result of a deferred location service request from the LCS server to the LCS client. The report is provided using a dialog between the client and the server that is initiated by the server.

One disadvantage of current LBS (locations based service) systems is that they are constructed so that the network based LCS must send a message to the mobile station, requesting that the mobile report its position. Thus, at least two messages are required every time a mobile reports its location to the network, one message from the network to the mobile and a response from the mobile to the network. In communication networks that may provide services to many millions of customers, such as cellular networks, it is desirable to reduce communications signaling to the greatest extent possible. Excess signaling can choke the network and cause reduced service quality for all customers.

One implementation provides a similar proprietary mobile-based GPS (Global Positioning System) solution based on a proprietary protocol (MPTP-Mobile Positioning Telematics Protocol). Recent products also provide assistance data capability, but in an indirect manner, as they are relatively independent of the underlying wireless network. Such an implementation, however, besides being proprietary, also has implications on location accuracy and reporting latency performance.

Current LCS implementations do not provide the capability to place a mobile terminal in tracking mode for autonomous periodic or event-driven location reporting to the network. Tracking involves "deferred" location reporting at the occurrence of event triggers that are defined in the location tracking request message. For example, a location-tracking request may be to provide location reports every ten minutes for a period of two hours; the event trigger in this case is realized by a timer that triggers every ten minutes for the duration of two hours. One realization of a location server is the GMLC (Gateway Mobile Location Center) as defined in GSM (Global System for Mobile Communications) and UMTS (Universal Mobile Telecommunication System)(using the control plane of the wireless network). However, tracking ("multiple reports") is currently not supported in the wireless radio network (for clients external to the radio network), and GMLC-based tracking supports limited triggers. The GMLC can be requested to provide periodic location reports to the client, but each report has to be individually generated by a GMLC request to the wireless network, such that the signaling overhead is costly and only tracking based on periodic reporting is possible.

What is needed is an improved location server implementation.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention addresses open issues with current solutions for LBS (Location Based Services) tracking applications. In one embodiment the location server supporting an open API (Application Programming Interface) (e.g., MLP-Mobile Location Protocol) resides in the mobile terminal instead of on the core network. Conventional implementations (e.g., MLP and 3GPP/3GPP2 specifications) only envisage the location server as residing on the wireless network and communicating with an external client.

In support thereof, the present invention disclosed and claimed herein, in one aspect thereof, comprises a mobile terminal system that includes a mobile communications component that communicates wireless signals, and a location services component that includes a location services (LCS) server that facilitates the determination of positioning information. It is a cost-effective system that facilitates the use of location tracking applications as a service in the mobile terminal.

In another aspect of the present invention, a terminal-based server of the mobile terminal makes possible the autonomous generation and reporting by the terminal of "deferred" location reports which results in bandwidth efficiencies and reduced latencies as compared to a network server solution. With autonomous reporting, signaling between the network and the mobile device is reduced because, for example, an instruction is not needed from the network each time the mobile reports its location. Thus, application of the terminal-based server greatly reduces signaling overhead over the traditional, standardized location reporting methods.

In yet another aspect thereof, the terminal-based LCS server is more versatile than a network server in the types of trigger events that can be supported. For instance, while network servers are capable of supporting timer-triggered reporting, it is impractical for them to support triggers based on terminal location or speed. A terminal server, on the other hand, is able to easily calculate velocity from the terminals on-board GPS receiver.

In still another aspect of the present invention, the invention takes advantage of the capabilities within a wireless network to improve the speed and accuracy of the location determination. For example, the terminal can request and obtain A-GPS (Assisted Global Positioning System) assistance data from the network and use the data over its validity period (2-3 hours typically) for fast, accurate, power-efficient and autonomous location determinations.

In another aspect thereof, the disclosed invention uses an open standards interface and is more tightly integrated with the wireless network than existing solutions. For example, the disclosed terminal-based server solution can use MO-LR (Mobile Originated-Location Request) and MT-LR (Mobile Terminated-Location Request) signaling to report location information, whereas existing terminal-based location software solutions rely on SMS (Short Message Service) or higher level packet-data applications to report location. The use of MO-LR and MT-LR allow not only faster location determination, but also support different mobile-based location technologies, tailor assistance data to the mobile terminal's capabilities, simplifies billing, and can potentially increase QoS (Quality-of-Service) capabilities.

In still another aspect thereof, there is provided a method that enables a bandwidth-efficient, versatile and low-latency terminal-based location tracking applications using the OMA/LIF MLP (Open Mobile Alliance/Location Interoperability Forum Mobile Location Protocol) protocol and terminal-based location technologies, with or without network assistance. In operation, a location client sends a location-tracking request (together with associated trigger parameters such as periodicity of location reports) to the location server either in the terminal or connected to the terminal. The request is sent using the open OMA/LIF-MLP protocol. After authenticating the client, the implementation can, depending on the location technology employed (e.g., Assisted-GPS), obtain the relevant assistance data from the wireless network and activate the triggers in the location request. Subsequently, at each trigger event the LCS server together with the mobile terminal autonomously generate a location report and sends it to the client. The location report may be sent using MLP or through the wireless network signaling protocol. (Note that MLP messages pass transparently through the wireless network over its User Plane while signaling messages are sent over the Control Plane and are non-transparent to the wireless network). Essentially, the method is a push-based rather than a pull-based solution.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Under some embodiments of the disclosed invention, full-fledged tracking is possible, however, using currently standardized signaling, but with a different implementation that requires implementing the location server functionality in the mobile terminal (using the User Plane and, optionally, the Control Plane) for these applications and GMLC (Gateway Mobile Location Center) remains unchanged and functions as originally envisaged. Tracking is fully supported and with reduced bandwidth overhead. Further reasons for supporting an LCS (LoCation Services) server in a mobile terminal include proven business case, revenues from terminal feature activation, Assistance Data Delivery, User Plane Traffic/GMLC processed requests, fully supported by current 3GPP & OMA (Open Mobile Alliance) standards, and is particularly applicable for market segments targeted by push-to-talk. The disclosed invention only requires AGPS (Assisted Global Positioning System) terminal API (Application Programming Interface) support of MLP (Mobile Location Protocol). Minimally, even a subset of MLP messages may be sufficient. An alternative implementation can include the GMLC as subclient. The Le connects the location client and location server. The defacto standard is the OMA/LIF MLP API application layer protocol, which is simple and secure, and based on existing and well-known Internet technologies such as HTTP (HyperText Transport Protocol), SSL/TLS (Secure Socket Layer/Transparent LAN Service) and XML (eXtensible Markup Language).

Location reporting triggers include timer-based (periodic or otherwise), absolute area (e.g., fixed location and given radius), relative location (e.g., to last reported location), emergency call, speed, manual, and all reports with or without user alert.

Location tracking solutions can be employed in a variety of applications but in particular, for enterprise customers that are in the same category as "Push-to-Talk" customers, including but not limited to, workforce management and security in the following areas: professional security, personal safety, lone worker protection, transportation and logistics, construction and maintenance, asset management, health, outdoor, travel and sports. Customers can consist of companies and service organizations that want to ensure the safety and security of corporate workforce and private people, generate immediate cost savings by streamlining operations and processes, improve productivity and efficiency by enabling mobile workforce management and communication and gain a competitive advantage.

The needed standards capabilities are already in place. In addition, some aspects such as USIM (Universal Subscriber Identity Module) and USAT (USIM Application Toolkit) may provide features that benefit from the disclosed architecture.

A technical specification for LCS can be found in document 3G TS 23.271 V2.0.0 (2000-12), entitled "3GPP Technical Specification Group Services and System Aspects, Functional Stage 2 Description of LCS (Release 4)", and in document 3GPP TS 22.071 V4.5.0 (2003-09), entitled "3GPP Technical Specification Group Services and System Aspects, Location Services (LCS), Service Description, Stage 1 (Release 4)", of both of which are incorporated herein by reference in their entirety.

Figure 1:
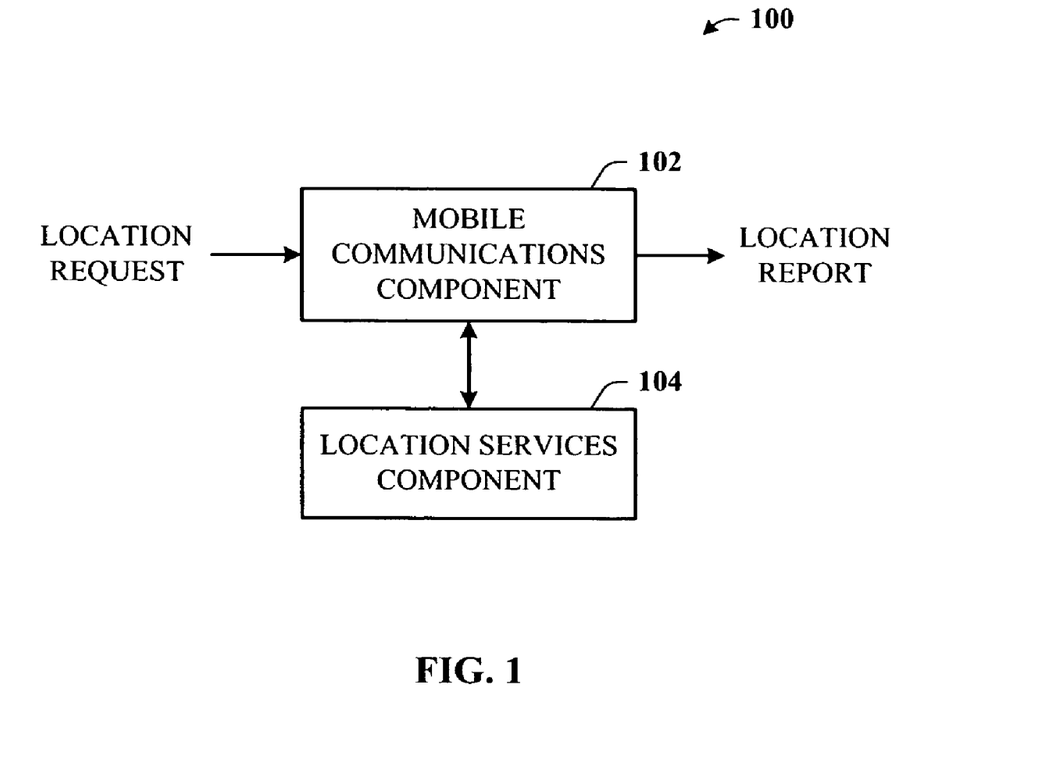
FIG. 1 illustrates a system of the present invention.

Referring now to FIG. 1, there is illustrated a system 100 of the present invention. The system 100 includes a mobile communications component 102 that facilitates the communication of wireless signals. Associated therewith is a location services component 104 that interfaces to the mobile communications component 102 to provide positioning information in a cellular network. The system 100 can be embodied as a mobile terminal (e.g., a cellular telephone) that includes both the mobile communications component 102 and the location services component 104. A location request signal can be received by the system 100 at the mobile communications component 102, and processed thereby in accordance with the location services component 104 to provide a location report.

Figure 2:
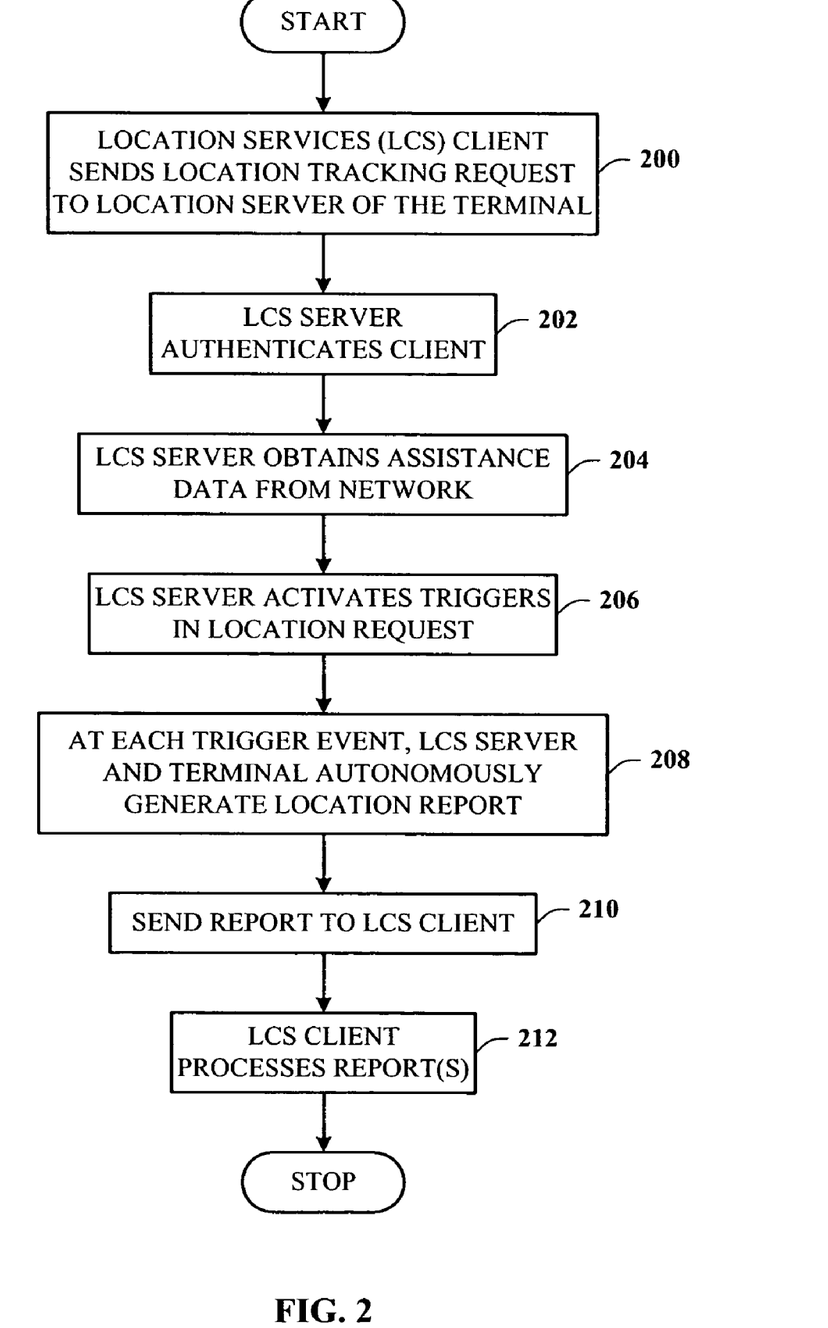
FIG. 2 illustrates a process of location tracking in accordance with the present invention.

Referring now to FIG. 2, there is illustrated a process of location tracking in accordance with the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

The disclosed architecture enables a bandwidth-efficient, versatile and low-latency terminal-based location tracking applications using OMA/LIF MLP and terminal-based location technologies, with or without network assistance. At 200, a location client sends a location-tracking request (together with associated trigger parameters such as periodicity of location reports) to the location server, which location server is associated with the mobile terminal either in the terminal or connected to the terminal. The request is sent using the open OMA/LIF MLP. At 202, the location server authenticates the client. At 204, after authenticating the location client, the implementation may, depending on the location technology employed (e.g., Assisted-GPS), obtain the relevant assistance data from the wireless network. At 206, the location server activates one or more of the triggers in the location request. Subsequently, at each trigger event, the location server together with the terminal autonomously generates a location report, as indicated at 208. At 210, the server sends the report to the client. The location report may be sent using MLP or through the wireless network signaling protocol. Note that MLP messages pass transparently through the wireless network over its User Plane, while signaling messages are sent over the Control Plane and are non-transparent to the wireless network. Essentially, the method is "push-based" rather than a "pull-based" solution. At 212, the location client receives the report and processes the report. There process then reaches a Stop block.

Figure 3:
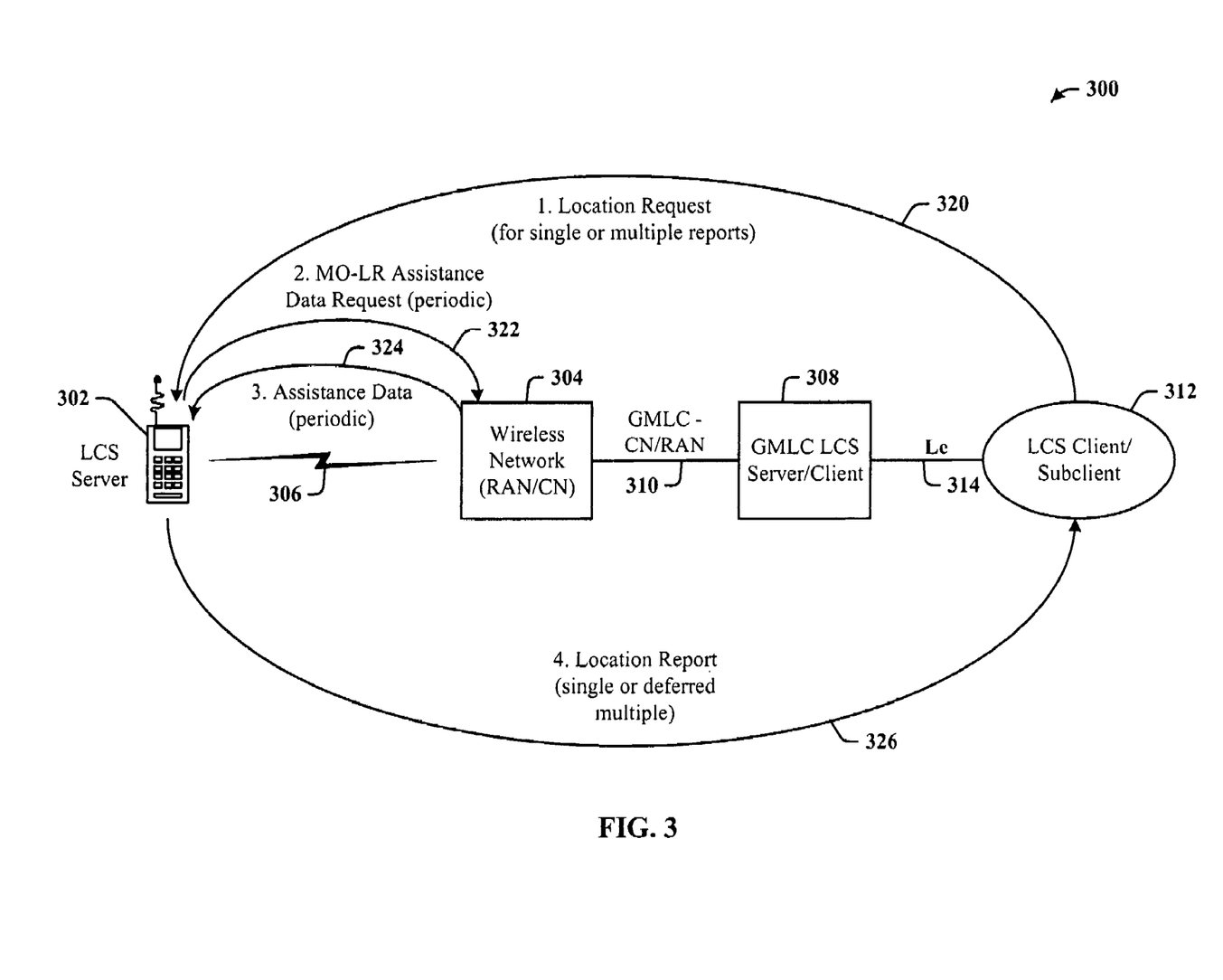
FIG. 3 illustrates signal flow in a system where an LCS server is embodied in a mobile terminal in accordance with the present invention.

Referring now to FIG. 3, there is illustrated signal flow of a system 300 where an LCS server is embodied in a mobile terminal 302 in accordance with the present invention. The system 300 includes the traditional network entities; the wireless mobile terminal 302 that communicates with a core network (CN) 304 (which can also be a radio access network (RAN)) over an air interface 306. The core network 304 interfaces to a GMLC LCS server 308 via a GMLC CN/RAN interface 310. The GMLC LCS server 308 then interfaces to an external LCS client 312 via an external interface (denoted Le) 314.

Conventionally, a location request from the LCS client 312 is processed by sending the request for single or multiple reports to the GMLC LCS server 308, which server 308 forwards a request for single reports only to the core network 304. The core network 304 forwards the request plus assistance data for single reports only over the air interface 306 to the terminal 302. The terminal 302, which can be AGPS capable, although this is not required, sends a single location report back to the core network 304. The network 304 then forwards the single location report to the GMLC LCS server 308, which location report (in single or multiple deferred reports) is forwarded to the LCS client 312.

Since the mobile terminal 302 now includes the LCS server, reporting can take different routes. In accordance with one aspect of the present invention, the location request/report bypasses the GMLC LCS server 308 entirely. By including at least an LCS server, the terminal 302 can receive a location request 320 (for single or multiple reports directly from the LCS client 312, which client 312 can also be a mobile terminal. In response, the terminal 302 sends an MO-LR (Mobile Originated-Location Request) assistance data request (periodic) 322 to the network 304 over the air interface 306. The network 304 processes the MO-LR request 322, and communicates assistance data (periodic) 324 back to the terminal 302 over the air interface 306. The terminal 302 then transmits a location report (single or deferred multiple) 326 directly back to the LCS client 312.

Figure 4:
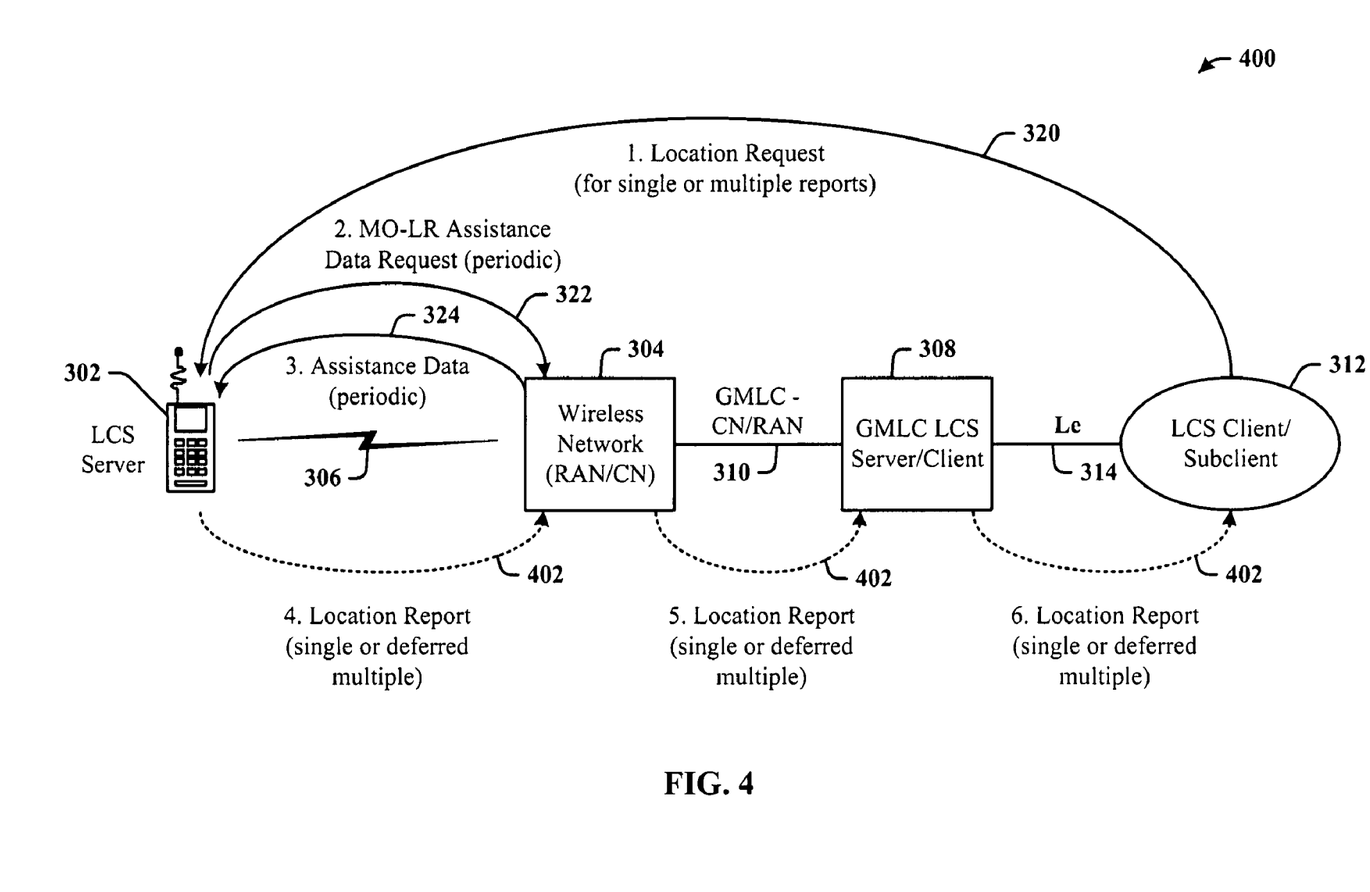
FIG. 4 illustrates alternative signal flow in a system where an LCS server is embodied in a mobile terminal in accordance with the present invention.

Referring now to FIG. 4, there is illustrated alternative signal flow of a system 400 where an LCS server is embodied in a mobile terminal 302 in accordance with the present invention. In this alternative signal path, the location request 320 is transmitted directly to the LCS server of the mobile terminal 302 bypassing the GMLC LCS server 308 entirely, but the report takes a path back through the GMLC LCS server 308 to the LCS client 312. The terminal 302 receives the location request 320 (for single or multiple reports) directly from the LCS client 312. In response, the terminal 302 sends the MO-LR assistance data request (periodic) 322 to the network 304 over the air interface 306. The network 304 processes the MO-LR request 322, and communicates assistance data (periodic) 320 back to the terminal 302 over the air interface 306. The terminal 302 then transmits a location report (single or deferred multiple) 402 back to the core network 304. The network 304 forwards the location report 402 to the GMLC LCS server 308, which then forwards the location report 402 to the LCS client 312. (Note that the location reports 326 of FIG. 3 and location reports 402 comprise the same report information, but can include different routing information according to the routing path between the various entities.)

Figure 5:
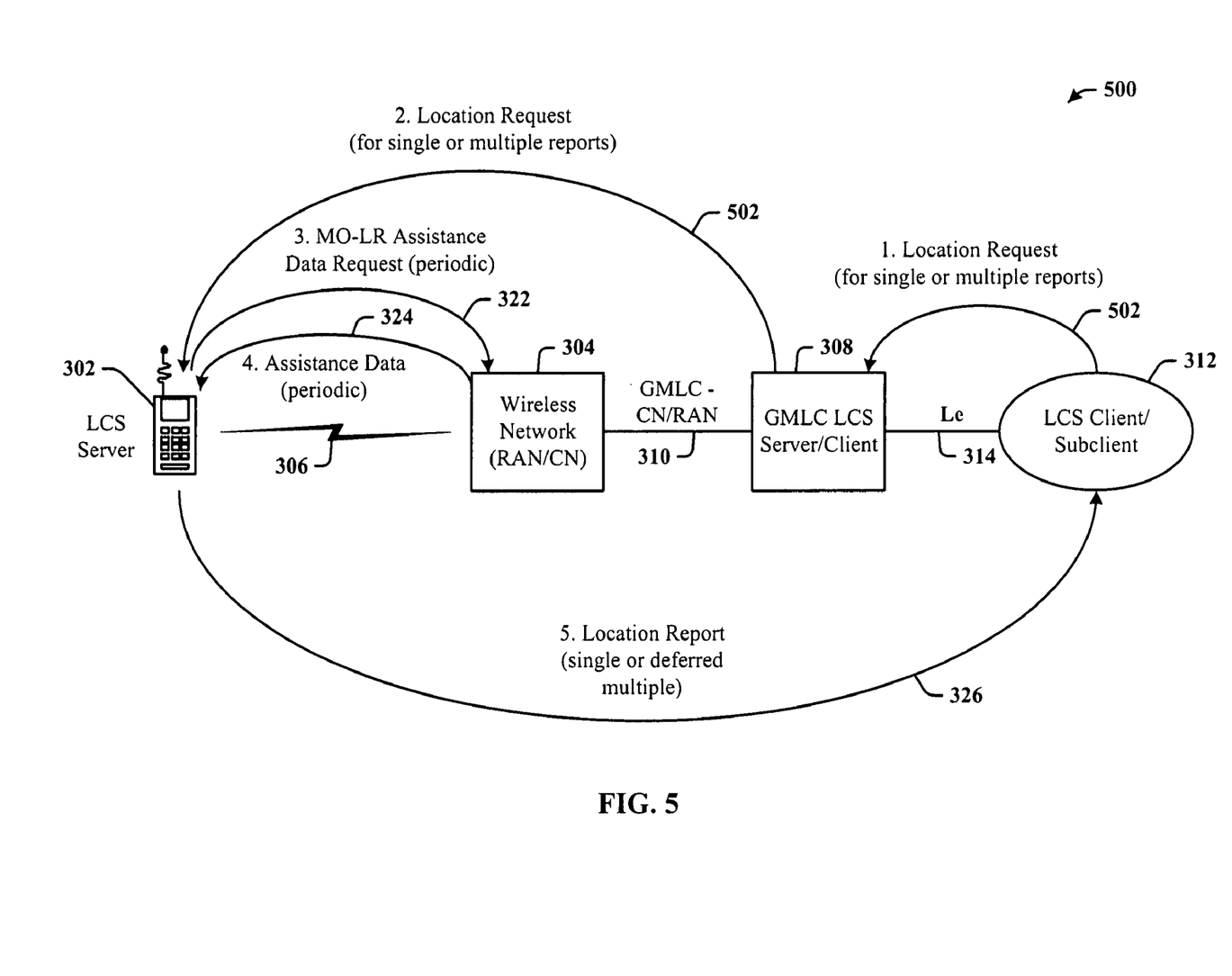
FIG. 5 illustrates alternative signal flow in a system where an LCS server is embodied in a mobile terminal in accordance with the present invention.

Referring now to FIG. 5, there is illustrated alternative signal flow of a system 500 where an LCS server is embodied in a mobile terminal 302 in accordance with the present invention. In this alternative signal path, a location request 502 is passed through the GMLC LCS server 308, but the report takes the direct path back to the LCS client 312, bypassing the server 308. Here, the LCS client 312 sends the location request 502 (for single or multiple reports) to the GMLC LCS server 308. The GMLC LCS server 308 then transmits the location request 502 directly to the terminal 302, bypassing the core network 304. In response, the terminal 302 sends the MO-LR assistance data request (periodic) 322 to the network 304 over the air interface 306. The network 304 processes the MO-LR request 322, and communicates assistance data (periodic) 324 back to the terminal 302. The terminal 302 then transmits the location report (single or deferred multiple) 326 directly back to the LCS client 312.

Figure 6:
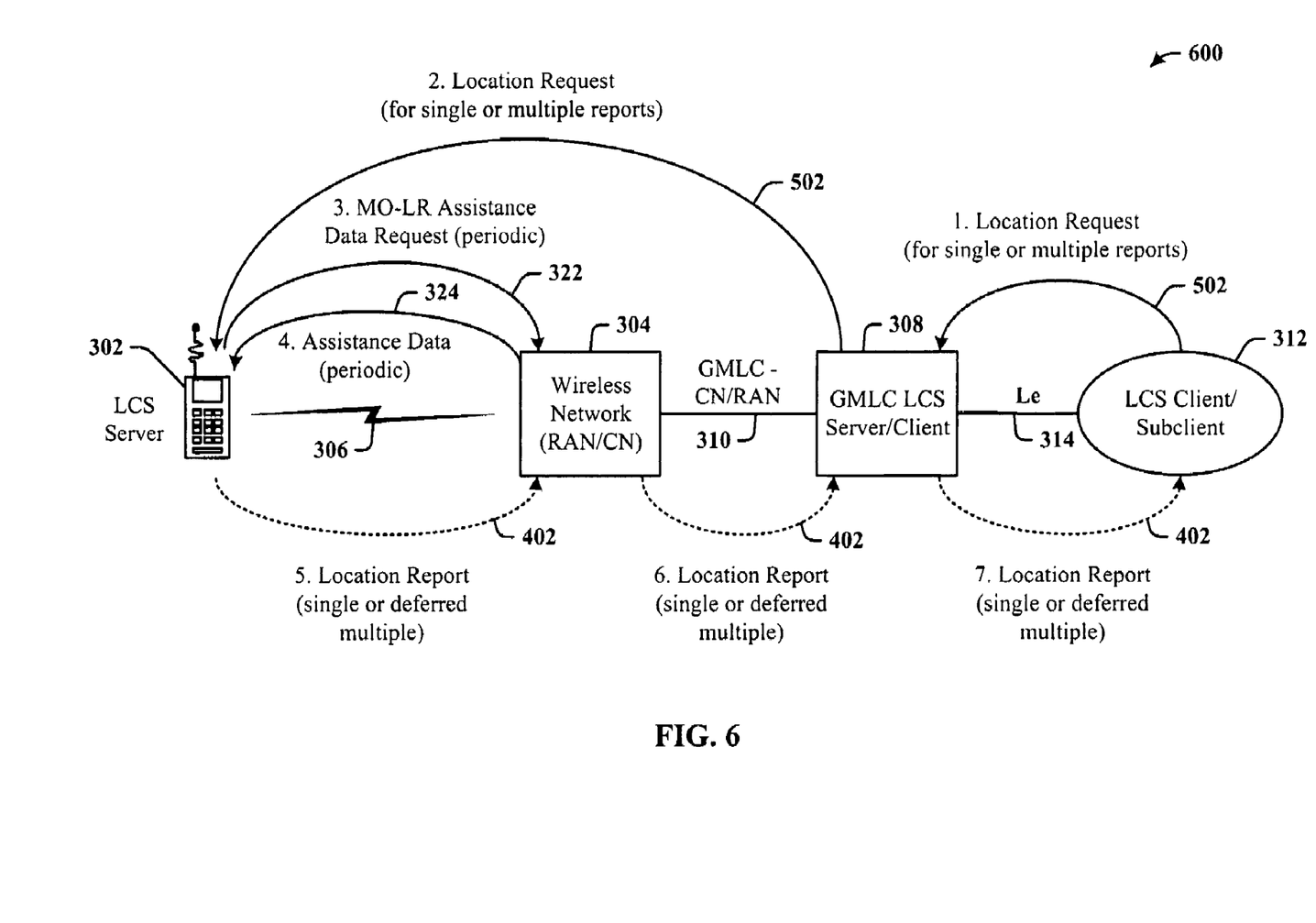
FIG. 6 illustrates alternative signal flow in a system where an LCS server is embodied in a mobile terminal in accordance with the present invention.

Referring now to FIG. 6, there is illustrated alternative signal flow of a system 600 where an LCS server is embodied in a mobile terminal 302 in accordance with the present invention. In this alternative signal path, a location request 502 is forwarded and returned through the GMLC LCS server 308. Here, the LCS client 312 sends the location request 502 (for single or multiple reports) to the GMLC LCS server 308. The GMLC LCS server 308 then transmits the location request 502 directly to the terminal 302, bypassing the core network 304. In response, the terminal 302 sends the MO-LR assistance data request (periodic) 322 to the network 304 over the air interface 306. The network 304 processes the MO-LR request 322, and communicates assistance data (periodic) 324 back to the terminal 302. The terminal 302 then transmits the location report (single or deferred multiple) 402 back to the core network 304. The network 304 forwards the location report 402 to the GMLC LCS server 308, which then forwards the location report 402 to the LCS client 312. Note that MO-LR uses terminal to RAN MO-LR messages and a subset of MT-LR (Mobile Terminated-Location Request) procedures.

Figure 7:
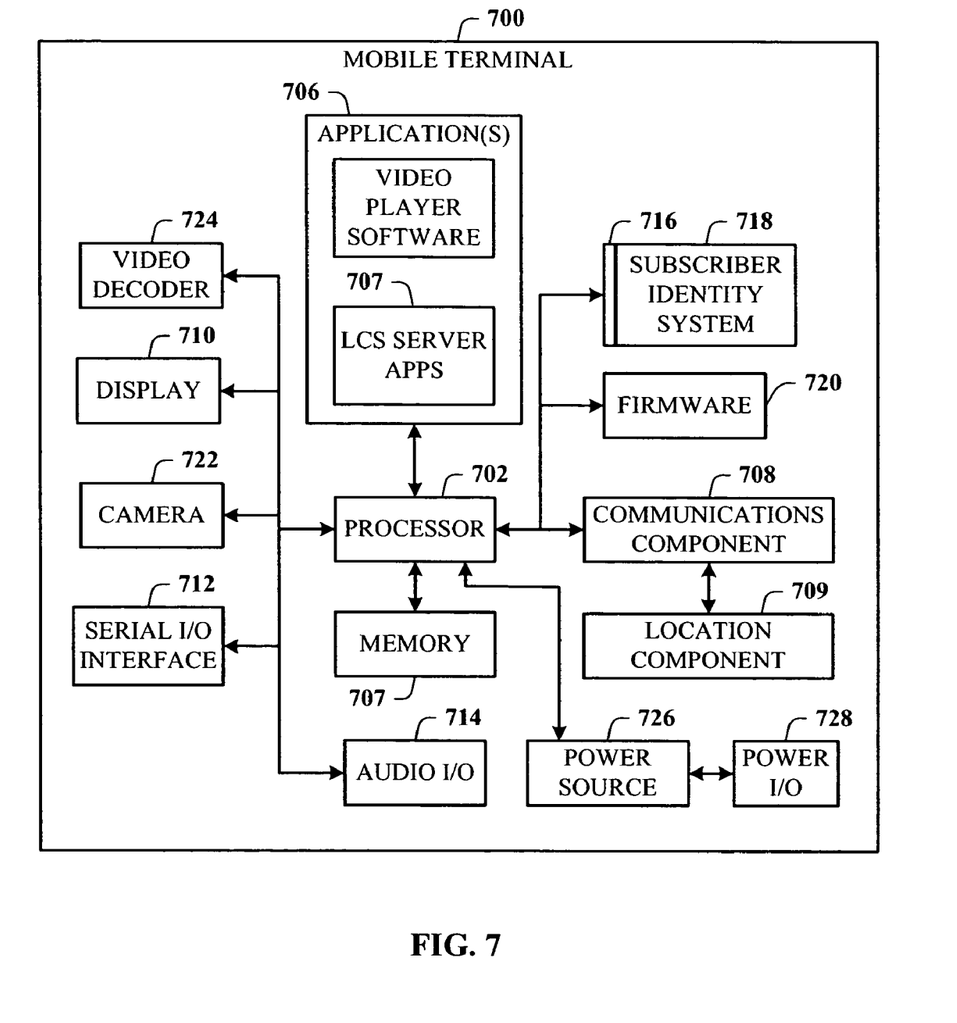
FIG. 7 illustrates a block diagram of a mobile device suitable for providing location services in accordance with the present invention.

Referring now to FIG. 7, there is illustrated a block diagram of a mobile device 700 suitable for providing location services in accordance with the present invention. The device 700 includes a processor 702 for controlling all onboard operations and processes. A memory 704 interfaces to the processor 702 for temporary storage of data and one or more applications 706 being executed by the processor 702. The applications 706 include the LCS server and related applications 707 for providing LCS services from the mobile terminal 700 in accordance with the present invention. A communications component 708 interfaces to the processor 702 to facilitate wired/wireless communication with external systems. The communications component 708 interfaces to a location component 709 (e.g., GPS transceiver) that facilitates location detection of the terminal 700. Note that the location component 709 can also be included as part of the communications component 708.

The device 700 includes a display 710 for displaying content downloaded in accordance with the present invention, and for displaying text information related to operating and using the device features. A serial I/O interface 712 is provided in communication with the processor 702 to facilitate serial communication (e.g., USB, and/or IEEE 1394) via a hardwire connection. This supports updating and troubleshooting the device 700, for example. Audio capabilities are provided with an audio I/O component 714, which can include a speaker for the output of audio signals related to, for example, recorded data or telephony voice data, and a microphone for inputting voice signals for recording and/or telephone conversations.

The device 700 includes a slot interface 716 for accommodating the SIS in the form factor of a card 718, and interfacing the SIS card 718 to the processor 702. Firmware 720 is also provided to store and provide to the processor 702 startup and operational data. The device 700 can also include an image capture component 722 such as a camera. The user can then take digital pictures, and transmit the pictures to a remote location or store the pictures locally. In more robust implementations, the device 700 includes a video decoder 724 for decoding encoded multimedia content. The device also includes a power source 726 in the form of batteries, which power source 726 interfaces to an external power system or charging equipment via a power I/O component 728.

The applications 706 resident on the device 700 include, for example, an operating system for configuring and manipulating local data and settings, a browser for interacting with websites, music players, video player software, and any other software suitable for operation on the device 700.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

A portable communications device typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Storage media includes both volatile and nonvolatile, removable and non-removable media implemented in any method or technology for storage of information such as computer readable instructions, data structures, program modules or other data. Storage media includes, but is not limited to, RAM, ROM, EEPROM, flash memory or other memory technology, or any other medium which can be used to store the desired information and which can be accessed by the processes on the portable device.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

What has been described above includes examples of the present invention. It is, of course, not possible to describe every conceivable combination of components or methodologies for purposes of describing the present invention, but one of ordinary skill in the art may recognize that many further combinations and permutations of the present invention are possible.

It is to be appreciated that there can be applications other than tracking that reside on the mobile terminal, for example, telematics, based on positioning is one possibility. Additionally, as mentioned, the proposed method does not preclude non-tracking applications.

It is to be appreciated that alternative design schemes can be employed whereby there can be penalties to incur, in development time and in performance, especially with regards to versatility and latencies associated with the location tracking.

Moreover, although one or more inventions disclosed herein have primarily been discussed in the context of "terminals," one skilled in the art understands that "terminals" is intended to encompass many devices, including mobile devices such as cellular phones, Personal Digital Assistants (PDAs), portable computers with wireless modems, etc.

Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates determining location-tracking information in a cellular network, comprising:
   a mobile communications component that communicates wireless signals through a mobile terminal; and
   a location services component included within the mobile terminal that facilitates the determination of positioning information, the location services component comprises a LCS (LoCation Services) server that directly receives a location request from a remote mobile client, authenticates the remote mobile client and transmits at least a location report to the remote client, bypassing a core network and a GMLC (Gateway Mobile Location Center) server for the transmission and the reception of the location report and location request.

2. The system of claim 1, wherein the mobile communications component includes assisted global positioning system (A-GPS) technology.

3. The system of claim 1, wherein the mobile communications component returns a location report to the remote mobile client in the form of a single or deferred multiple report.

4. The system of claim 1, wherein the mobile communications component communicates using an OMA/LIF MLP (Open Mobile Alliance/Location Interoperability Forum Mobile Location Protocol).

5. The system of claim 1, wherein the location services component facilitates autonomous generation and reporting of a deferred location report.

6. The system of claim 1, wherein the location services component facilitates timer-triggered reporting.

7. The system of claim 1, wherein the location services component facilitates the determination of velocity via an on-board location receiver.

8. The system of claim 1, wherein the location services component facilitates the use of at least one of a mobile-originated location request or a mobile-terminated location request to report location information.

9. The system of claim 1, wherein the location services component obtains relevant assistance data from a core wireless network.

10. The system of claim 1, wherein the location services component activates one or more triggers in a location request message.

11. The system of claim 1, wherein the location services component facilitates the generation of a location report at each trigger event of a location request message.

12. The system of claim 1, wherein the location services component uses A-GPS data over a validity period.

13. A multimode cellular telephone that comprises the system of claim 1.

14. A mobile terminal that facilitates determining location-tracking information, comprising:
   a communications component that communicates wireless signals; and
   an LCS server that provides location information directly to a mobile remote location services (LCS) client by processing a location request message received directly from the remote location services (LCS) client, bypassing a Radio Access Network (RAN) and a GMLC (Gateway Mobile Location Center) server for receiving the location request message and for transmitting the location information.

15. The mobile terminal of claim 14, wherein the LCS server generates a location report to a remote client in the form of a single or deferred multiple report.

16. The mobile terminal of claim 14, wherein the mobile terminal receives the location request message directly from a remote wireless client and authenticates the remote wireless client.

17. The mobile terminal of claim 14, wherein the LCS server facilitates autonomous generation and reporting of a deferred location report.

18. The mobile terminal of claim 14, wherein at least one of the location request message or the location information is transmitted via a user plane.

19. The mobile terminal of claim 14, wherein at least one of the location request message or the location information is transmitted via a control plane.

20. The mobile terminal of claim 14, wherein the LCS server activates one or more triggers in the location request message.

21. The mobile terminal of claim 20, wherein the one or more triggers are based on at least one of a timer, an absolute area, a relative location, an emergency call, a velocity, a manual signal, or a report that is with or without a user alert.

22. The mobile terminal of claim 14, wherein the LCS server facilitates the generation of a location report at each of the one or more triggers of the location request message.

23. The mobile terminal of claim 14, wherein a wireless client communicates the location request message indirectly through a server to the LCS server to receive the location information.

24. A method of providing location-tracking information, comprising:
   employing in a mobile terminal device a location services application that includes a LCS server;
   bypassing a core network and a GMLC (Gateway Mobile Location Center) server to directly receive one or more location requests from a requesting mobile client remote from the terminal; and
   bypassing a core network and a GMLC (Gateway Mobile Location Center) server to directly provide the location-tracking information to the requesting mobile client remote from the terminal.

25. The method of claim 24, further comprising autonomously generating a location-tracking report for communication from the mobile terminal device to the requesting mobile client remote from the terminal.

26. The method of claim 24, further comprising requesting assistance data from a mobile communications network.

27. The method of claim 26, wherein the assistance data is compatible with an A-GPS technology.

28. The method of claim 24, further comprising transmitting the location-tracking information from the mobile terminal device as a location-tracking report in the form of a single or deferred multiple report.

29. The method of claim 24, further comprising communicating the location-tracking information using an OMA/LIF MLP (Open Mobile Alliance/Location Interoperability Forum Mobile Location Protocol).

30. The method of claim 24, further comprising authenticating a remote wireless device that communicates with the mobile terminal device using the location services application.

31. The method of claim 24, further comprising:
   receiving a location request message that includes an event; and
   processing the event to generate the location-tracking information.

32. The method of claim 24, further comprising processing a location request message using the location services application to determine a velocity.

33. The method of claim 24, further comprising:
   receiving a location request message that includes one or more trigger events; and
   activating the one or more trigger events at the mobile terminal device to provide the location-tracking information.

34. The method of claim 24, further comprising communicating the location-tracking information via at least one of a user plane or a control plane.

35. The method of claim 24, further comprising receiving a location request message via at least one of a user plane or a control plane.

36. A method of providing location-tracking information, comprising:
   including an LCS server in a mobile terminal device;
   receiving a location request message directly from a remote mobile client bypassing a core network and a GMLC (Gateway Mobile Location Center) server;
   processing the location request message with the LCS server to autonomously generate a location-tracking report; and
   communicating the location-tracking report directly to the remote client bypassing a core network and the GMLC (Gateway Mobile Location Center) server.

37. The method of claim 36, further comprising:
   activating one or more trigger events in the location request message; and
   generating a location-tracking report at each of the one or more triggers.

38. The method of claim 36, further comprising transmitting the location-tracking report to the remote mobile terminal device via at least one of a user plane or a control plane.

39. The method of claim 36, further comprising:
   requesting and obtaining assistance information, and using the assistance information for the duration of its validity period.

40. The method of claim 36, further comprising processing one or more event triggers of the location request message based upon at least one of location or speed of the mobile terminal device.

41. A system that facilitates the generation of location-tracking information in a mobile terminal device, comprising:
   means for bypassing a core network and a GMLC (Gateway Mobile Location Center) server to receive location request directly with a requesting mobile client remote from the mobile terminal device;

means for processing the location request message to activate a trigger event contained therein;

means for obtaining assistance data from a wireless network;

means for autonomously generating a location-tracking report based on the trigger event; and means for communicating the location-tracking report to the requesting client bypassing a core network and a GMLC (Gateway Mobile Location Center) server.

* * * * *